United States Patent

Abe

[19]

[11] Patent Number: 6,104,884
[45] Date of Patent: Aug. 15, 2000

[54] INTERNAL INDICATOR OF A VIEWFINDER

[75] Inventor: Tetsuya Abe, Hokkaido, Japan

[73] Assignee: Asahi Kogaku Kogyo Kabushiki Kaisha, Tokyo, Japan

[21] Appl. No.: 09/318,757

[22] Filed: May 26, 1999

[30] Foreign Application Priority Data

May 26, 1999 [JP] Japan ............................ 10-144515

[51] Int. Cl.[7] .................................................. G03B 17/20
[52] U.S. Cl. ............................................................. 396/296
[58] Field of Search .......................................... 396/296

[56] References Cited

U.S. PATENT DOCUMENTS

| 5,420,657 | 5/1995 | Kosako ........................... 396/373 |
| 5,488,446 | 1/1996 | Kirigaya et al. ................ 396/296 |
| 5,581,318 | 12/1996 | Shiratori ........................ 396/296 |
| 5,802,408 | 9/1998 | Suda ............................... 396/296 |
| 5,839,007 | 11/1998 | Kawakami ..................... 396/296 |
| 5,893,650 | 4/1999 | Ohmura ....................... 396/296 X |
| 6,002,887 | 12/1999 | Chiba et al. ................. 396/296 X |

*Primary Examiner*—W. B. Perkey
*Attorney, Agent, or Firm*—Greenblum & Bernstein, P.L.C.

[57] ABSTRACT

Disclosed is an internal indicator of a viewfinder, wherein the viewfinder includes an viewfinder optical system including an objective optical system and an eyepiece optical system, an image formed by the objective optical system being viewed through the eyepiece optical system, the internal indicator including: an information indicating device, positioned in the vicinity of the image formed by the objective optical system, for indicating information that is seen through the eyepiece optical system; a prism for reflecting light which is emitted from the information indicating device and carries the information towards the eyepiece optical system; and a diaphragm positioned to correspond to at least an incident or exit surface of the prism.

18 Claims, 4 Drawing Sheets

INTERNAL INDICATOR OF A VIEWFINDER

BACKGROUND OF THE INVENTION

1. Field of the Invention

The present invention relates to an indicator, provided within an optical viewfinder of a camera or the like, for visually indicating information in the field of the viewfinder, and particularly relates to an indicator, provided within a viewfinder of an SLR camera or a real-image viewfinder, for visually indicating information in the field of the viewfinder.

2. Description of the Related Art

In a conventional viewfinder such as a viewfinder of a single-lens reflex camera (SLR camera) or a real-image viewfinder, an information indicating element (e.g., an LCD panel) for visually indicating viewfinder information (e.g., shutter speed information, exposure value information, etc.) is disposed within the viewfinder to be positioned substantially parallel with the viewfinder optical axis in the vicinity of an image formed through the objective optical system, while a prism is disposed between the information indicating element and the eyepiece optical system of the viewfinder to deflect the optical path of the light carrying viewfinder information so that the viewfinder information can be seen together with a finder view (object images) via the eyepiece of the viewfinder.

In such a conventional type of viewfinder, since the divergent bundle of rays emitted from the information indicating element is reflected towards the eyepiece optical system by the prism, part of the divergent bundle of rays is reflected by the edge surface portions of the prism producing stray light which may cause a ghost image and/or a flare.

SUMMARY OF THE INVENTION

An object of the present invention is to provide an internal indicator of a viewfinder in which a ghost image and/or a flare in the view of the viewfinder is prevented from occurring, and can be provided at a low cost of production, without modifying the design of the finder optical system.

To achieve the above-mentioned object, according to an aspect of the present invention, there is provided an internal indicator of a viewfinder, wherein the viewfinder includes an viewfinder optical system including an objective optical system and an eyepiece optical system, an image formed by the objective optical system being viewed through the eyepiece optical system, the internal indicator including: an information indicating device, positioned in the vicinity of the image formed by the objective optical system, for indicating information that is seen through the eyepiece optical system; a prism for reflecting light which is emitted from the information indicating device and carries the information towards the eyepiece optical system; and a diaphragm positioned to correspond to at least an incident or exit surface of the prism.

Preferably, the diaphragm is positioned on the incident surface of the prism, the incident surface facing the information indicating device.

Preferably, the diaphragm is positioned on the exit surface of the prism, the exit surface facing the eyepiece optical system.

Preferably, the prism includes a flat surface portion formed at a corner of the prism between a reflecting surface of the prism and the exit surface of the prism, the flat surface portion extending substantially parallel to an optical axis of the eyepiece optical system.

Preferably, a flat surface is provided on a corner of the prism between a reflecting surface of the prism and the exit surface of the prism, the flat surface extending substantially parallel to a ray of light within the viewfinder optical system, the ray of light passing close to the flat surface.

Preferably, the flat surface portion includes an anti-reflection surface.

Preferably, the anti-reflection surface includes a mat surface.

Preferably, the anti-reflection surface includes a mat black painted surface.

Preferably, a housing for supporting the prism and the information indicating device is provided, the diaphragm being formed integral with the housing.

Preferably, the internal indicator is incorporated in a camera, the objective optical system being a photographic lens attached to a body of the camera.

Preferably, the camera is an SLR camera.

Preferably, the viewfinder optical system further includes an erecting optical system.

Preferably, the erecting optical system includes a relay lens system through which an inverted primary image formed by the objective optical system is erected to form a secondary image which is seen through the eyepiece optical system, and wherein the information indicating device is positioned in the vicinity of the secondary image.

Preferably, the information indicating device includes an LCD panel.

Preferably, the information indicating device includes an LED indicator.

Note that the expression "an image formed through the objective optical system" in the present specification refers to the primary image formed through the objective optical system and any other images which are equivalent to the primary image.

The present disclosure relates to subject matter contained in Japanese Patent Application No. 10-144515 (filed on May 26, 1998) which is expressly incorporated herein by reference in its entirety.

BRIEF DESCRIPTION OF THE DRAWINGS

The invention will be discussed below in detail, with reference to the accompanying drawings, in which.

DESCRIPTION OF THE PREFERRED EMBODIMENTS

Figure 1:
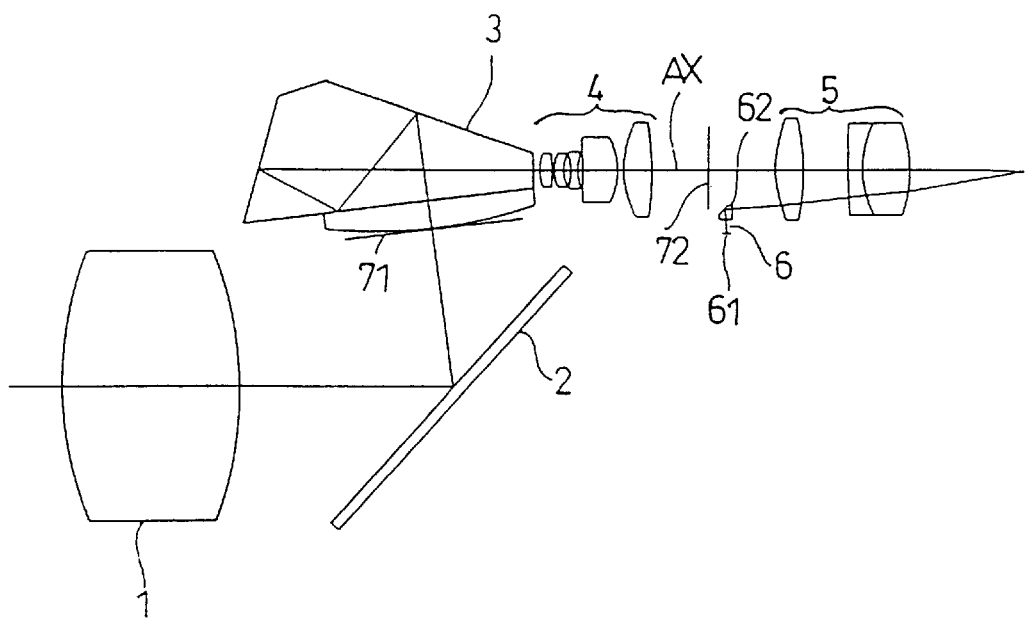
FIG. 1 is a side elevational view of an embodiment of a viewfinder optical system of an SLR camera which is provided with an internal indicator unit to which the present invention is applied.

FIG. 1 shows an embodiment of a viewfinder optical system of an SLR camera which is provided with an internal indicator unit 6. The viewfinder optical system of the SLR camera is provided with a photographic lens group 1 as an objective optical system having positive power, a reflective mirror 2, a trapezoid prism 3, a relay lens system 4 and a eyepiece optical system 5 having positive power, in this order from the object side. A primary image 71 formed through the photographic lens group 1 is erected by the relay lens system 4, which serves as an erecting optical system, to form a secondary image 72 which is viewed through the eyepiece optical system 5. The indicator unit 6 is disposed in the vicinity of the secondary image 72, which is formed through the relay lens system 4. The indicator unit 6 indicates various photographic information such as shutter speed information, aperture value information etc., so that the user of the SLR camera can see the various information via the eyepiece optical system 5. The photographic lens group 1 can be a photographic lens group in an interchangeable lens barrel which can be detachably attached to the body of the SLR camera.

Figure 2:
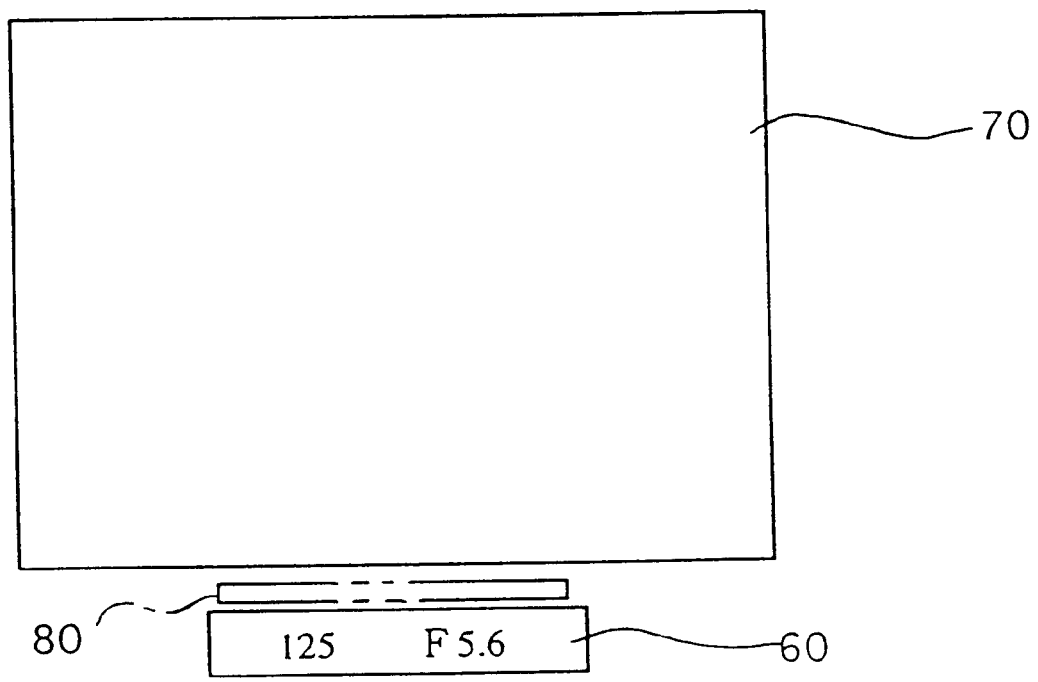
FIG. 2 is a front elevational view of a rectangular finder view and an indicator view which are seen through the eyepiece of the viewfinder optical system shown in FIG. 1.
Figure 3:
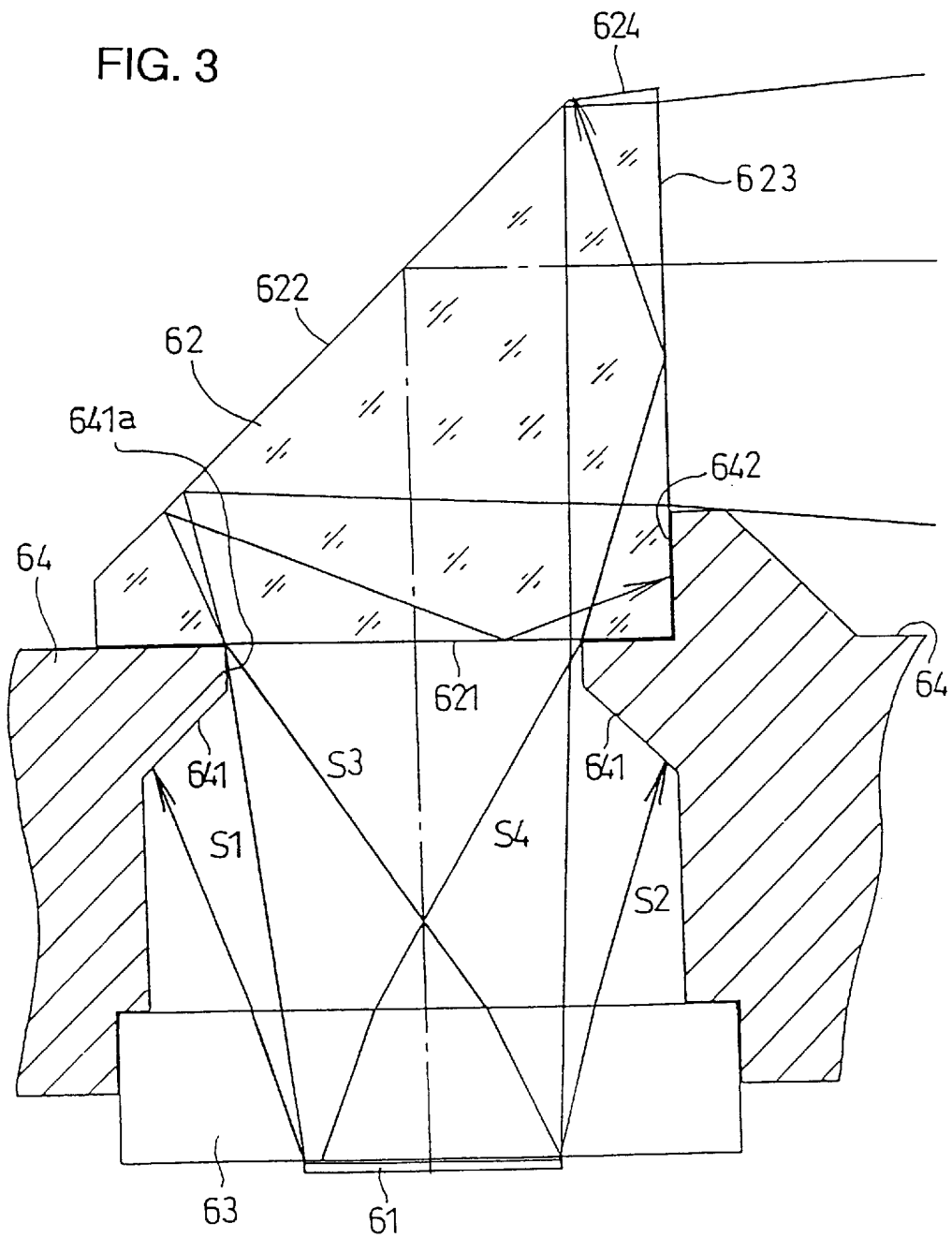
FIG. 3 is a cross sectional view of the internal indicator unit provided in the SLR camera shown in FIG. 1, showing a state of stray light intercepted by a fixed diaphragm.

As shown in FIG. 3, the indicator unit 6 is provided with an information indicating element 61, which can be an LCD panel or an LED indicator having a series of tiny LEDs. As shown in FIG. 2, the user can see a rectangular finder view 70 through the eyepiece optical system 5, which corresponds to an image formed on the film frame, and an indicator view 60 positioned under the finder view 70. The indicator view 60 contains characters representing various photographic information indicated by the information indicating element 61 of the indicator unit 6. As can be seen in FIG. 1, the indicator unit 6 is positioned below an eyepiece optical axis (an optical axis of the viewfinder optical system) AX of the eyepiece optical system 5 positioned away from the eyepiece optical axis AX by a predetermined distance. Due to this arrangement, the indicator view 60 is indicated under the finder view 70 as shown in FIG. 2 so that the finder view 70 and the indicator view 60 can be seen at the same time through the eyepiece optical system 5.

As shown in FIG. 3, the indicator unit 6 is provided with the information indicating element 61, a protection glass 63, and the prism 62. The protection glass 63 is fixed onto the information indicating element 61, while the prism 62 is positioned above the protection glass 63. If the information indicating element 61 is an LCD panel, a light source for illuminating the LCD panel is disposed in the vicinity thereof. The prism 62 and the protection glass 63 are fixed to a housing 64 fixed to the camera body.

The prism 62 is provided with an incident surface 621, a reflecting surface 622 and an exit surface 623. The light which is emitted from the information indicating element 61 passes through the protection glass 63 and subsequently enters the incident surface 621. Thereafter the light which enters the prism 6 from the incident surface 621 is incident on the reflecting surface 622 to be reflected thereby towards the exit surface 623 so that the exit light proceeds towards the eyepiece optical system 5.

Rays of light emitted from the information indicating element 61 are reflected by the reflecting surface 622 of the prism 62 towards the eyepiece optical system 5 in a direction substantially parallel to the eyepiece optical axis AX. The indicator view 60 is viewed as an enlarged view thereof through the eyepiece optical system 5. In FIG. 2, although "125" and "F5.6" which represent the shutter speed of 1/125 and the f-number of F5.6, respectively, are indicated in the indicator view 60, it should be noted that the information indicated in the indicator view 60 is not limited solely to such specific information.

In an embodiment, the first and second fixed diaphragms 641 and 642 most suitable for the incident surface 621 and the exit surface 623, respectively, are provided to prevent a ghost image and/or a flare which may be caused by light reflected by an edge surface portion of the prism 62 from occurring in peripheral part of the indicator view 60. In the context of the specification and claims, "diaphragm" is indicative of a device to regulate the passage of light, and is inclusive of diaphragms that surround an optical path, or that are offset to one side of an optical path, and others of similar functionality.

The housing 64, through which the prism 62 and the information indicating element 61 are fixed with respect to the camera body, is provided on the first incident surface 621 with the fixed diaphragm 641. The housing 64 is further provided on the exit surface 623 with the second fixed diaphragm 642.

As shown in FIG. 3, the prism 62 is positioned on the fixed diaphragm 641. The first fixed diaphragm 641 is formed so as to have a rectangular opening 641a which is smaller than the rectangular incident surface 621 of the prism 62 so as to cover all four sides of the rectangular incident surface 621. The second fixed diaphragm 642 is formed to cover lower part of the exit surface 623.

The prism 62 is provided at the corner between the reflecting surface 622 and the exit surface 623 with a flat surface portion 624 which extends substantially parallel to the eyepiece optical axis AX. Although a slightly inclined flat surface portion 624 is shown in FIG. 3, this is considered to be within the meaning of substantially parallel to the eyepiece optical axis AX.

In FIG. 3, rays of light S1, S2, S3 and S4 are obstructive rays of light of divergent bundle of rays emitted from the information indicating element 61. If the first fixed diaphragm 641 is not provided between the prism 62 and the information indicating element 61, each of the rays of light S1 and S2 would be reflected by the edge surface portion of the prism 62 producing a stray light ray. However, in the present embodiment, the rays of light S1 and S2 are prevented from entering the prism 62 by the first fixed diaphragm 641, so that a ghost image or a flare does not occur from the rays of light S1 and S2.

Rays of light S3 and S4 cannot be prevented from entering the prism 62 by the first fixed diaphragm 641. However, in the present embodiment, the ray of light S3 is incident on and absorbed by the second fixed diaphragm 642, while the ray of light S4 passes through or absorbed by the flat surface portion 624, so that a ghost image or a flare does not occur from the rays of light S3 and S4.

It is preferable that the indicator view 60 be positioned so as to be viewed close to the finder view 70. To this end, in the case where the indicator unit 6 is positioned in the vicinity of the eyepiece optical axis AX, a portion of the rays of light passing through the objective optical system 1 are incident on the prism 62. In this case, if part of such incident light is reflected by the flat surface portion 624 of the prism 62, the reflected light passes through the eyepiece optical system 5 to be viewed as a ghost image 80 (shown by two-dot chain line in FIG. 2) through the eyepiece optical system 5.

Figure 4:
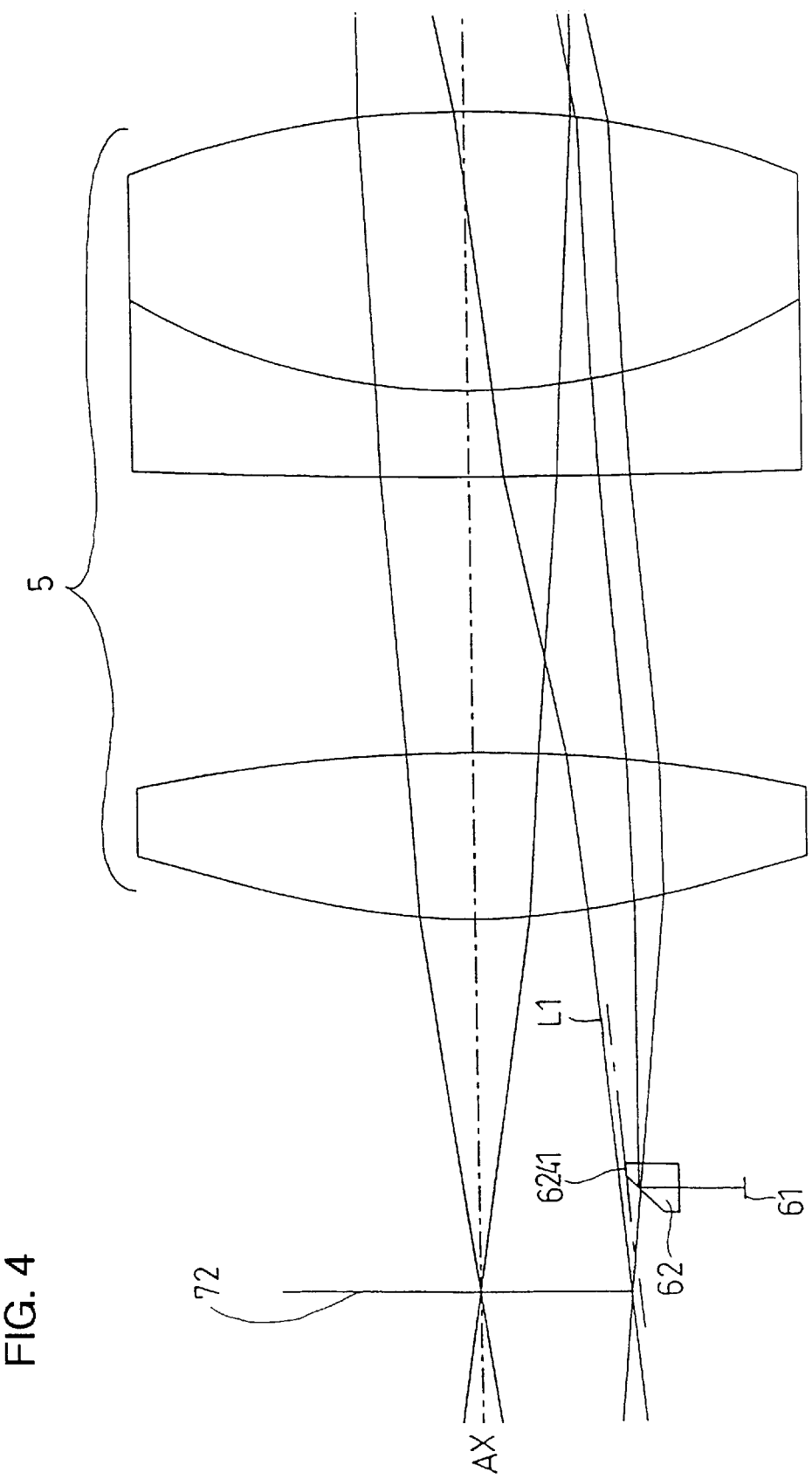
FIG. 4 a side elevational view of part of another embodiment of a viewfinder optical system of an SLR camera which is provided with an internal indicator unit to which the present invention is applied.

FIG. 4 shows another embodiment of a viewfinder optical system of an SLR camera which is provided with an internal indicator unit. According to this embodiment, the occurrence of the ghost image 80 can be effectively prevented. In FIG. 4, only part of the viewfinder optical system from the indicator unit 6 to the eyepiece optical system 5 is shown. This embodiment is identical to the previous embodiment except for a flat surface 6241 provided on the corner between the reflecting surface 622 and the exit surface 623.

A portion of the rays of light emitted from the relay lens system 4 are incident on the prism 62 and pass close to the flat surface 6241. A ray of light L1 shown in FIG. 4 passes close to the flat surface portion 6241 of the prism 62. That is, the light ray L1 passes closest to the flat surface 6241, outside of the prism 62, originating from the light which emerges from the lower end of the secondary image 72. As shown in FIG. 4, the flat surface 6241 is positioned to be substantially parallel to the ray of light L1. With this arrangement, even if stray light occurs due to a ray of light reflected by the flat surface 6241, the stray light will not be viewed through eyepiece optical system 5. Consequently, any ghost image such as the ghost image 80 shown in FIG. 2 will not be viewed through the eyepiece optical system 5.

In each of the aforementioned embodiments, if each surface of the second fixed diaphragm 642 and the flat surface portion 624 is formed as an anti-reflection surface, the rays of light S3 and S4 are prevented from being reflected by the surface of the second fixed diaphragm 642 and the surface of the flat surface portion 624 in a more effective manner. Furthermore, if each of the outer surfaces of the reflecting surface 622 and the flat surface portion 624 is formed as an anti-reflection surface, the light which is emitted from the relay lens system 4 to be incident on the prism 62 is absorbed by the anti-reflection surfaces, so that a ghost image can be prevented from occurring much more effectively. The anti-reflection surface can be made, e.g., by forming the surface as a mat surface or painting the surface with a mat black paint.

As can be seen from the foregoing, although the indicator unit 6 does not include any specially-prepared additional optical elements which can increase the cost of production, the occurrence of stray light is effectively prevented by simply modifying the shapes of the prism 62 and the fixed housing 64.

As can be clearly understood from the foregoing, since the internal indicator includes: an information indicating device, positioned in the vicinity of the image formed by the objective optical system, for indicating information that is seen through the eyepiece optical system; a prism for reflecting light which is emitted from the information indicating device and carries the information towards the eyepiece optical system; and a diaphragm positioned to correspond to at least an incident or exit surface of the prism; an internal indicator of a viewfinder can be provided in which a ghost image or a flare in the view of the viewfinder is prevented from occurring at a low cost of production without modifying the design of the finder optical system.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An internal indicator of a viewfinder, wherein said viewfinder includes an viewfinder optical system comprising an objective optical system and an eyepiece optical system, an image formed by said objective optical system being viewed through said eyepiece optical system, said internal indicator comprising:

an information indicating device, positioned in the vicinity of said image formed by said objective optical system, for indicating information that is seen through said eyepiece optical system;

a prism for reflecting light which is emitted from said information indicating device and carries said information towards said eyepiece optical system; and a diaphragm positioned on at least one of an incident surface and an exit surface of said prism to intercept stray ghost-forming light from said information indicating device.

2. The internal indicator according to claim 1, wherein said diaphragm is positioned on said incident surface of said prism, said incident surface facing said information indicating device.

3. The internal indicator according to claim 1, wherein said diaphragm is positioned on said exit surface of said prism, said exit surface facing said eyepiece optical system.

4. The internal indicator according to claim 1, wherein said prism comprises a flat surface portion formed at a corner of said prism between a reflecting surface of said prism and said exit surface of said prism, said flat surface portion extending substantially parallel to an optical axis of said eyepiece optical system.

5. The internal indicator according to claim 4, wherein said flat surface portion comprises an anti-reflection surface.

6. The internal indicator according to claim 5, wherein said anti-reflection surface comprises a mat surface.

7. The internal indicator according to claim 5, wherein said anti-reflection surface comprises a mat black painted surface.

8. The internal indicator according to claim 1, further comprising a flat surface provided on a corner of said prism between a reflecting surface of said prism and said exit surface of said prism, said flat surface extending substantially parallel to a ray of light within said viewfinder optical system, said ray of light passing closest to said flat surface and outside said prism.

9. The internal indicator according to claim 8, wherein said flat surface comprises an anti-reflection surface.

10. The internal indicator according to claim 9, wherein said anti-reflection surface comprises a mat surface.

11. The internal indicator according to claim 9, wherein said anti-reflection surface comprises a mat black painted surface.

12. The internal indicator according to claim 1, further comprising a housing for supporting said prism and said information indicating device, said diaphragm being formed integral with said housing.

13. The internal indicator according to claim 1, said internal indicator being incorporated in a camera, said objective optical system being a photographic lens attached to a body of said camera.

14. The internal indicator according to claim 13, wherein said camera is an SLR camera.

15. The internal indicator according to claim 1, wherein said viewfinder optical system further comprises an erecting optical system.

16. The internal indicator according to claim 15, wherein said erecting optical system comprises a relay lens system through which an inverted primary image formed by said objective optical system is erected to form a secondary image which is seen through said eyepiece optical system, and wherein said information indicating device is positioned in the vicinity of said secondary image.

17. The internal indicator according to claim 1, wherein said information indicating device comprises an LCD panel.

18. The internal indicator according to claim 1, wherein said information indicating device comprises an LED indicator.

* * * * *